(12) United States Patent
Ikeda et al.

(10) Patent No.: US 10,520,068 B2
(45) Date of Patent: Dec. 31, 2019

(54) GEAR AND AN ELECTRIC ACTUATOR PROVIDED THEREWITH

(71) Applicant: NTN Corporation, Osaka-shi (JP)

(72) Inventors: Yoshinori Ikeda, Iwata (JP); Hayato Kawaguchi, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 15/429,517

(22) Filed: Feb. 10, 2017

(65) Prior Publication Data

US 2017/0152926 A1 Jun. 1, 2017

Related U.S. Application Data

(63) Continuation of application No. PCT/JP2015/072708, filed on Aug. 10, 2015.

(30) Foreign Application Priority Data

Aug. 12, 2014 (JP) .................. 2014-164063

(51) Int. Cl.
    *F16H 25/22* (2006.01)
    *F16H 55/17* (2006.01)
    *F16H 25/20* (2006.01)
    *F16H 55/06* (2006.01)
    *F16H 1/20* (2006.01)

(52) U.S. Cl.
    CPC ..... *F16H 25/2204* (2013.01); *F16H 25/2015* (2013.01); *F16H 55/06* (2013.01); *F16H 55/17* (2013.01); *F16H 1/20* (2013.01); *F16H 2025/204* (2013.01); *F16H 2025/2081* (2013.01); *F16H 2055/065* (2013.01)

(58) Field of Classification Search
    CPC .. F16H 25/2204; F16H 25/2015; F16H 55/06; F16H 55/17; F16H 1/20; F16H 2025/2081; F16H 2055/065
    See application file for complete search history.

(56) References Cited

U.S. PATENT DOCUMENTS

| | | | | |
|---|---|---|---|---|
| 2,947,482 A | * | 8/1960 | Lione ................. | B05B 3/005 239/227 |
| 3,612,557 A | * | 10/1971 | Berlenbach ........... | A63C 9/005 280/629 |
| 4,109,545 A | * | 8/1978 | Hayasaka ............. | F16H 55/12 474/152 |

(Continued)

FOREIGN PATENT DOCUMENTS

| | | |
|---|---|---|
| CN | 102705480 | 10/2012 |
| EP | 1 023 960 A2 | 8/2000 |

(Continued)

*Primary Examiner* — Zakaria Elahmadi

(74) *Attorney, Agent, or Firm* — Harness, Dickey & Pierce, P.L.C.

(57) ABSTRACT

A sintered gear and an electrical actuator with the sintered gear where the sintered gear has spur teeth formed on a circumference of the gear. A central hole is on the center of the gear. A boss is formed around the central hole. A peripheral portion is formed radially inward of the teeth. A thickness of a region between the boss and the peripheral portion is thinner than that of the boss. The peripheral portion is formed on at least one side of the gear. The peripheral portion has an axially larger thickness than the region between the boss and peripheral portion.

5 Claims, 6 Drawing Sheets

(56) References Cited

U.S. PATENT DOCUMENTS

| | | | | |
|---|---|---|---|---|
| 5,593,360 A | * | 1/1997 | Ishida | F16H 1/46 |
| | | | | 475/331 |
| 2004/0232265 A1 | * | 11/2004 | Morise | A01K 89/01 |
| | | | | 242/311 |
| 2007/0186710 A1 | * | 8/2007 | Miyauchi | F16H 55/06 |
| | | | | 74/431 |
| 2008/0141812 A1 | * | 6/2008 | Okabe | B21H 5/005 |
| | | | | 74/434 |
| 2009/0011071 A1 | * | 1/2009 | Hagihara | B29C 45/0025 |
| | | | | 425/573 |
| 2010/0224020 A1 | * | 9/2010 | Haussecker | F16H 55/17 |
| | | | | 74/425 |
| 2012/0128414 A1 | * | 5/2012 | Hiraoka | A01K 89/0114 |
| | | | | 403/354 |
| 2013/0061716 A1 | * | 3/2013 | Kamimura | B23K 9/028 |
| | | | | 74/7 E |
| 2016/0327145 A1 | * | 11/2016 | Yanagisawa | F16H 55/06 |

FOREIGN PATENT DOCUMENTS

| | | |
|---|---|---|
| JP | 58-213801 | 12/1983 |
| JP | 2007-046476 | 2/2007 |
| JP | 2010-069995 | 4/2010 |
| JP | 2011-196465 | 10/2011 |
| JP | 2012-177440 | 9/2012 |
| JP | 2013-148108 | 8/2013 |

\* cited by examiner $\delta = 0.1mm \sim 0.5mm$
$W = 1H \sim 2H$

GEAR AND AN ELECTRIC ACTUATOR PROVIDED THEREWITH

CROSS-REFERENCE TO RELATED APPLICATIONS

This application is a continuation of International Application No. PCT/JP2015/072708, filed Aug. 10, 2015, which claims priority to Japanese Application No. 2014-164063, filed Aug. 12, 2014. The disclosures of the above applications are incorporating herein by reference.

FIELD

The present disclosure relates to a sintered gear with improved quality and to an electric actuator with a speed reduction mechanism including the sintered gear and a ball screw mechanism. The actuators are adapted to be used in motors in general industries and driving sections of automobiles etc. More particularly, the disclosure relates to an electric actuator that converts a rotary motion from an electric motor to a linear motion of a driving shaft, via the ball screw mechanism.

BACKGROUND

Generally, gear mechanisms, such as a trapezoidal thread worm gear mechanism or a rack and pinion gear mechanism as a mechanism to convert a rotary motion of an electric motor to an axial linear motion in an electric linear actuator, are used in various kinds of driving sections. These motion converting mechanisms involve sliding contact portions. Thus, power loss is increased and simultaneously size of electric motor and power consumption are also increased. Thus, the ball screw mechanisms have been widely used as more efficient actuators.

FIG. 7 illustrates an electric actuator utilizing a ball screw mechanism. The electric actuator 51 includes a housing 52 with a first housing 52a and a second housing 52b. An electric motor 53 is mounted on the housing 52. A speed reduction mechanism 57 transmits the rotational power of the electric motor 53 to a ball screw mechanism 58, via a motor shaft 53a. The ball screw mechanism 58 converts the rotational motion of the electric motor 53 into the axial linear motion of a driving shaft 59 via the speed reduction mechanism 57. The ball screw mechanism 58 has a nut 61 formed with a helical screw groove 61a on its inner circumference. The nut is rotationally and axially immovably supported via supporting bearings 66 mounted on the housing 52. A screw shaft 60 is axially integrated with the driving shaft 59. The screw shaft 60 includes a helical screw groove 60a on its outer circumference corresponding to the helical screw groove 61a of the nut 61. The screw shaft 60 is inserted into the nut 61 via a plurality of balls 62 and is axially movably but non-rotationally supported.

The electric motor 53 is mounted on the first housing 52a. A bore 63a and a blind bore 63b are formed, respectively, in the first and second housings 52a, 52b to contain the screw shaft 60. The speed reduction mechanism 57 has an input gear 54, secured on the motor shaft 53a, an intermediate gear 55 and an output gear 56, secured on the nut 61, and mating with the intermediate gear 55.

A gear shaft 64 is supported on the first and second housings 52a, 52b. Bushes 65, of synthetic resin, are interposed in either one or both of the spaces between the gear shaft 64 and intermediate gear 55 or between the first and second housings 52a, 52b and the gear shaft 64. Thus, the intermediate gear 55 can be rotationally supported relative to the housing 52. Accordingly, it is possible to provide an electric actuator 51 that can interrupt or reduce the transmission of vibration caused by play between the intermediate gear 55 and the gear shaft 64 as well as by play of gear shaft 64 itself. (See, JP2013-148108 A)

In the prior art electric actuator 51, the rotational power of the electric motor 53 is transmitted to the nut 61, of the ball screw mechanism 58, via the speed reduction mechanism 57, including the input gear 54, the intermediate gear 55 and the output gear 56. The nut 61 is rotationally supported by a pair of the supporting bearings 66 with deep groove ball bearings. The output gear 56 is arranged between the two supporting bearings 66 and secured on the nut 61, via a key. The output gear 56 contacts an inner ring 67 of one of the supporting bearings 66.

The inner rings 67 of the bearings 66 are secured on the outer circumference of the nut 61 and thus rotate together with the nut 61. On the other hand, the outer rings 68 of the bearings 66 cannot rotate since they are securely fit in the housing 52. Accordingly, smooth rotation of the output gear 56 would be impaired if the side surface of the output gear 56 contacts the end face of the outer ring 68 of the bearing 66. Thus, the output gear 56 is formed so that its axial thickness is smaller than its boss 56a that contacts the inner ring 67 of the bearing 66. This prevents contact of the output gear 56 against the outer ring 68 of the bearing 66.

Accordingly, the output gear 56 is formed so that its axial thickness is small except for its boss 56a, as shown in FIG. 8(b). In the output gear 56, with such a configuration, only the boss 56a contacts a supporting surface 69. The tooth tip portion 56b does not contact the supporting surface 69 when the output gear 56 is placed on the supporting surface 69 during manufacturing of the output gear 56. Accordingly, it is believed that a bow is created in the tooth tip portion 56b, as shown by an arrow in FIG. 9. This would impair the manufacturing accuracy of the output gear 56.

Especially in the case of a gear made of sintered alloy, such as the prior art output gear 56 used in the electric actuator 51, the configuration of the output gear 56 would deform under its own weight due to an insufficiency of the binding degree of powder for a time until desired strength has been obtained after completion of the sintering treatment in the manufacturing processes. In addition, corners of teeth of the sintered output gear 56 tend to be damaged. Thus, a problem exists that damage occurs to the teeth caused by interference of the teeth tips 56b with a surface 69 of a supporting table due to vibrations during transfer of the gears 56 in a laid down state just after their compaction during manufacturing steps.

SUMMARY

It is, therefore, an object of the present disclosure to provide a sintered gear with improved quality that can prevent tooth damage and deformation, such as bow of the teeth, during manufacturing steps of the sintered gear. An electric actuator would be provided with such a sintered gear.

To achieve the object of the present disclosure, a gear formed of sintered alloy comprises spur teeth formed on a circumference of the gear. A central hole is on the center of the gear. A boss is formed around the central hole. A peripheral portion is formed radially inward of the teeth. A thickness of a region between the boss and the peripheral portion is thinner than that of the boss. The peripheral portion is formed on at least one side of the gear and has an axially larger thickness.

The spur teeth are formed on a circumference of the gear. A central hole is on the center of the gear. A boss is formed around the central hole. A peripheral portion is formed radially inward of the teeth. A thickness of a region between the boss and the peripheral portion is thinner than that of the boss. The peripheral portion is formed on at least one side of the gear and has an axially large thickness. Thus, it is possible to easily form a gear with a desired exact configuration and dimension even though it has a complicated configuration requiring high manufacturing accuracy. Also, it is possible to prevent gear teeth from being damaged due to interference of the teeth tips with a surface of a supporting table during motion or transfer of the gears. Additionally, gear teeth damage is prevented due to deformation caused by the weight of gear itself even if the binding degree of powder is insufficient. In addition, it is possible to prevent an accuracy degradation of the gear caused by contact of not only the boss but also the peripheral portion near the teeth tips against the supporting table when the gear is laid on the table during the manufacturing steps. Thus, it is also possible to provide a gear with improved quality.

The axial thickness of the peripheral portion and that of the boss of the gear are substantially same. Side faces of the peripheral portion and the boss of at least one side of the gear are substantially axially flush with each other.

The clearance amount between the tooth and the peripheral portion of the gear is limited within a range of 0.1~0.5 mm. This makes it possible to protect the tooth tip of the gear. Also, it keeps the suppress variation of the density of each part of the gear, due to variation of compaction distance in sintering, to a minimum.

A width of a stepped portion from the peripheral portion to the tooth tip is set to 1~2 times the entire depth of the tooth. This makes it possible to prevent the bow of the tooth tip portion due to deformation of the peripheral portion even if the gear is laid on a table.

A plurality of lightening holes are formed equidistantly along a circle between the peripheral portion and the boss. This keeps the strength and rigidity while reducing the weight of the gear.

An electric actuator comprises a housing, an electric motor mounted on the housing, a speed reduction mechanism and ball screw mechanism. The ball screw mechanism is able to convert the rotational motion of the electric motor to the axial linear motion of a drive shaft. The ball screw mechanism includes a nut and a screw shaft. The nut is formed with a helical screw groove on its inner circumference. The nut has an output gear secured on its outer circumference. The output gear forms part of the speed reduction mechanism. The nut is rotationally but axially immovably supported relative to the housing by a pair of supporting bearings mounted on the housing. The screw shaft is formed with a helical screw groove on its outer circumference that corresponds to the helical screw groove of the nut. A large number of balls are inserted into the nut. The shaft is axially movably but non-rotationally supported relative to the housing. An end face of an inner ring of one supporting bearing, of the pair of supporting bearings, and a side surface of the boss closely contact each other. The output gear is configured by a gear defined above The electric actuator comprises a housing, an electric motor mounted on the housing, a speed reduction mechanism and a ball screw mechanism. The ball screw mechanism is able to convert the rotational motion of the electric motor to the axial linear motion of a drive shaft. The ball screw mechanism includes a nut and a screw shaft. The nut is formed with a helical screw groove on its inner circumference. An output gear is secured on its outer circumference. The output gear forms part of the speed reduction mechanism. The nut is rotationally but axially immovably supported relative to the housing by a pair of supporting bearings mounted on the housing. The screw shaft is formed with a helical screw groove on the outer circumference corresponding to the helical screw groove of the nut. A large number of balls are inserted into the nut. The shaft is axially movably but non-rotationally supported relative to the housing. An end face of an inner ring of one supporting bearing of the pair of supporting bearings and a side surface of the boss closely contact each other. The output gear is configured by a gear defined above. Thus, it is possible to provide an electric actuator with improved quality that can achieve smooth rotation of the output gear. This prevents gear teeth damage and gear bow which would be caused during manufacture of the sintered gear.

The gear of the present disclosure comprises spur teeth formed on a circumference of the gear. A central hole is on the center of the gear. A boss is formed around the central hole. A peripheral portion is formed radially inward of the teeth. A thickness of a region between the boss and the peripheral portion is thinner than that of the boss. The peripheral portion is formed on at least one side of the gear and has an axially larger thickness. Thus, it is possible to easily form a gear with a desired exact configuration and dimensions even though it has a complicated configuration requiring high processing accuracy. Also, it is possible to prevent the gear teeth from being damaged due to interference of the teeth tips with a surface of a supporting table during motion or transfer of the gears. Additionally, deformation is prevented that would be caused by the weight of the gear itself even if the binding degree of powder is insufficient. In addition, it is possible to prevent accuracy degradation of the gear, caused by contact of not only the boss but also the peripheral portion near the teeth tips against the supporting table, when the gear is laid on the table during the manufacturing steps. Thus, it is also possible to provide a gear with improved quality.

The electric actuator of the present disclosure comprises a housing, an electric motor mounted on the housing, a speed reduction mechanism and a ball screw mechanism. The ball screw mechanism is able to convert the rotational motion of the electric motor to the axial linear motion of a drive shaft. The ball screw mechanism includes a nut and a screw shaft. The nut is formed with a helical screw groove on its inner circumference. An output gear is secured on its outer circumference. The output gear forms part of the speed reduction mechanism. The nut is rotationally but axially immovably supported relative to the housing by a pair of supporting bearings mounted on the housing. The screw shaft is formed with a helical screw groove on the outer circumference that corresponds to the helical screw groove of the nut. A large number of balls are inserted into the nut. The nut is axially movably but non-rotationally supported relative to the housing. An end face of an inner ring of one supporting bearing of the pair of supporting bearings and a side surface of the boss closely contact each other. The output gear is configured by a gear defined above. Thus, it is possible to provide an electric actuator with improved quality that can achieve smooth rotation of the output gear. Also, it prevents gear teeth damage and gear bow that would be caused during manufacture of the sintered gear.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Hereafter, embodiments of the present disclosure will be specifically described with reference to the attached drawings.

A mode for carrying out the present invention has an electric actuator that includes a housing, an electric motor mounted on the housing, a speed reduction mechanism and a ball screw mechanism. The ball screw mechanism converts the rotational motion of the electric motor to the axial linear motion of a drive shaft. The ball screw mechanism includes a nut and a screw shaft. The nut is formed with a helical screw groove on its inner circumference. An output gear is secured on its outer circumference. The output gear forms part of the speed reduction mechanism. The nut is rotationally but axially immovably supported relative to the housing by a pair of supporting bearings mounted on the housing, The screw shaft is formed with a helical screw groove on its outer circumference that corresponds to the helical screw groove of the nut. A large number of balls are inserted into the nut. The shaft is axially movably but non-rotationally supported relative to the housing. The speed reduction mechanism includes an intermediate gear mating with an input gear secured on a motor shaft of the electric motor. The output gear integrally secured on the nut forms a part of the ball screw mechanism. An end face of an inner ring of one supporting bearing of the pair of supporting bearings and a side surface of the boss closely contact each other. The output gear is formed of sintered alloy. The output gear has spur teeth formed on the circumference of the output gear. A central hole is on the center of the output gear. A boss is formed around the central hole. A peripheral portion is formed radially inward of the teeth. A thickness of a region between the boss and the peripheral portion is thinner than other portions of the output gear. A plurality of lightening holes is formed equidistantly along a circle between the peripheral portion and the boss. The axial thickness of the peripheral portion and that of the boss of the gear are substantially the same. Side faces of the peripheral portion and the boss of at least one side of the gear are axially flush with each other.

Figure 1:
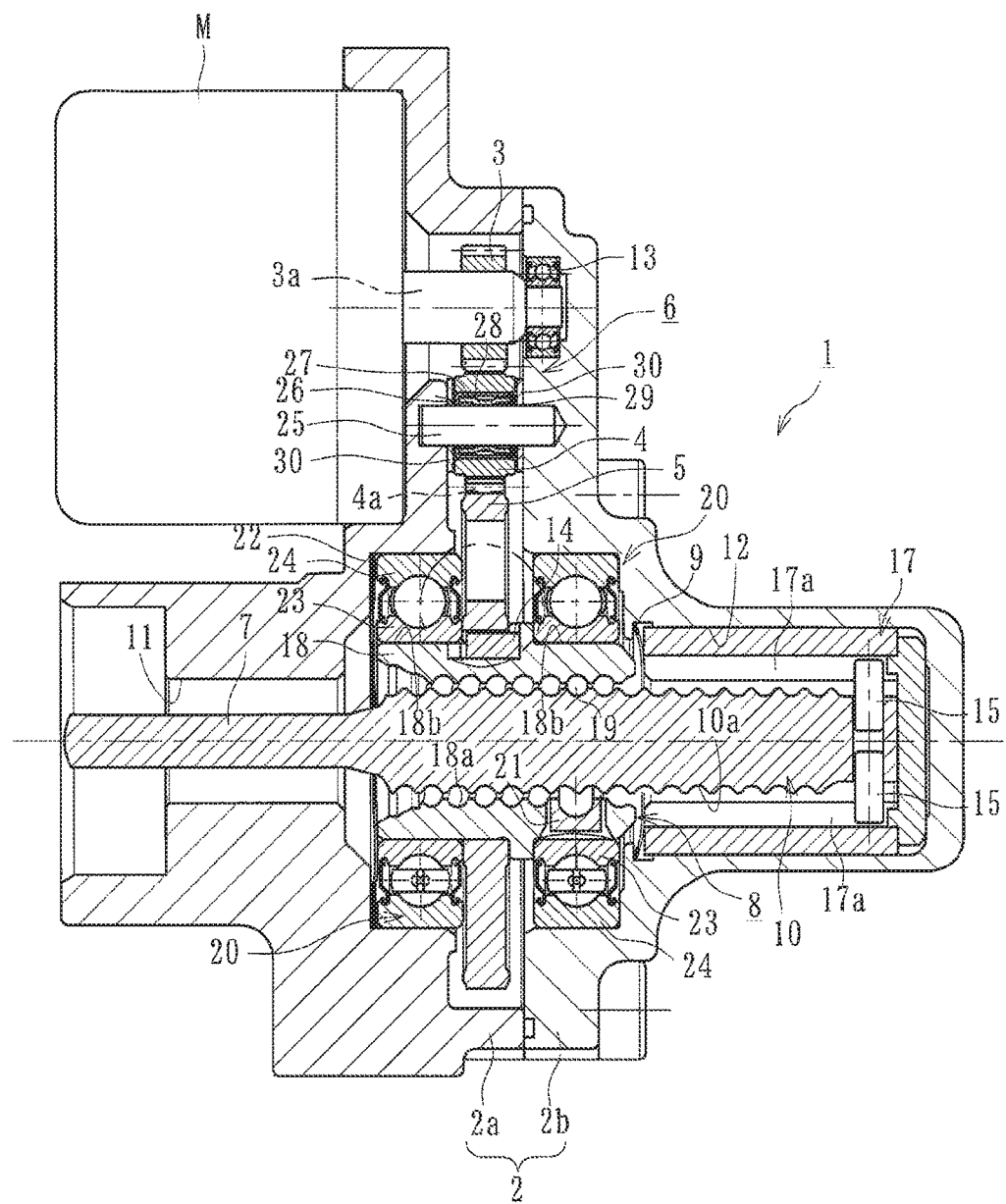
FIG. 1 is a longitudinal section view of one embodiment of an electric linear actuator of the present disclosure.
Figure 2:
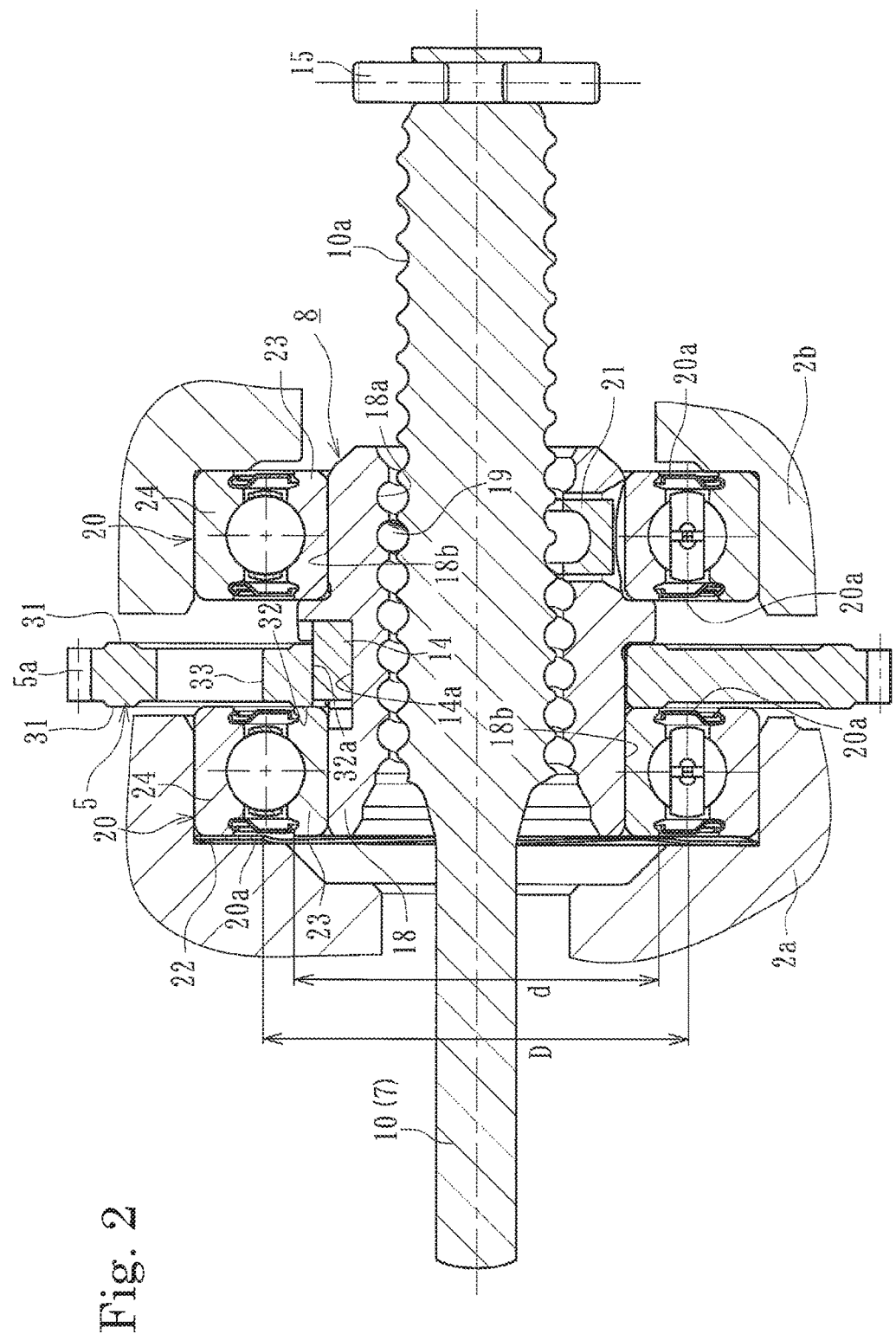
FIG. 2 is an enlarged longitudinal section view of the ball screw mechanism of FIG. 1.
Figure 3:
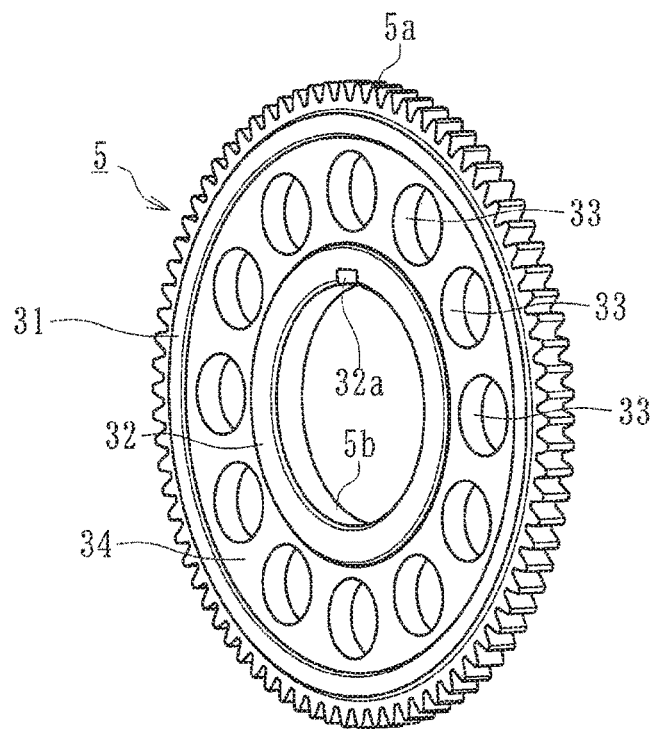
FIG. 3 is a perspective view of an output gear of the present disclosure.
Figure 4:
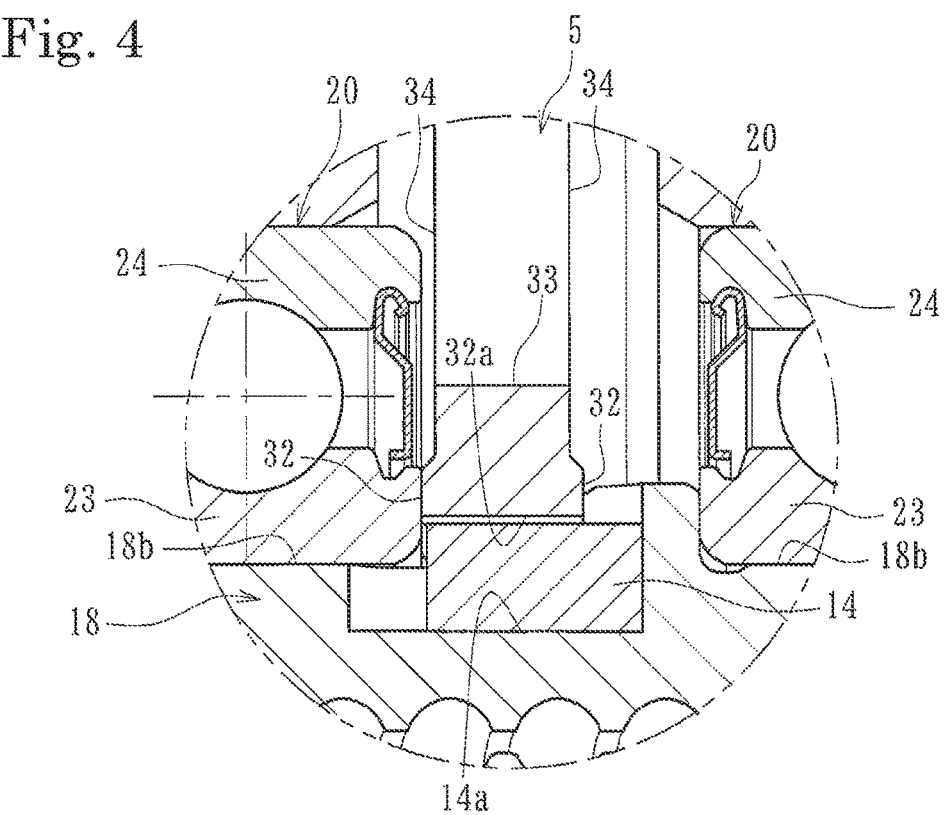
FIG. 4 is a partially enlarged view of a contact portion between the output gear of FIG. 1 and a supporting bearing.
Figure 5A:
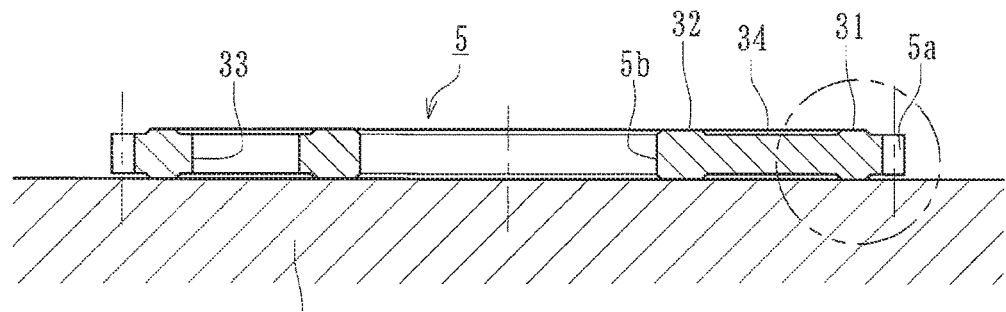
FIG. 5(a) is an explanatory view of a state of the output gear of FIG. 1 laid on a supporting table.
Figure 5B:
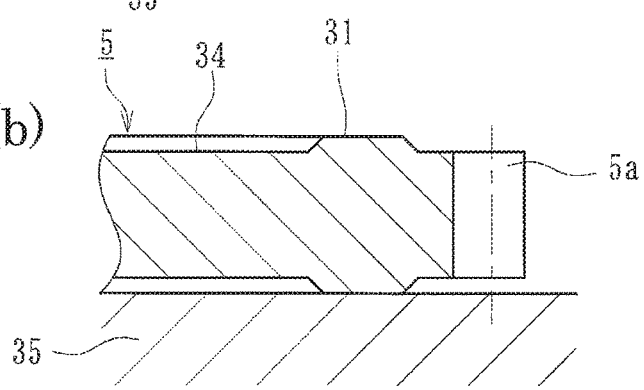
FIG. 5(b) is a partially enlarged view of a tooth tip of the output gear of FIG. 5(a).
Figure 6:
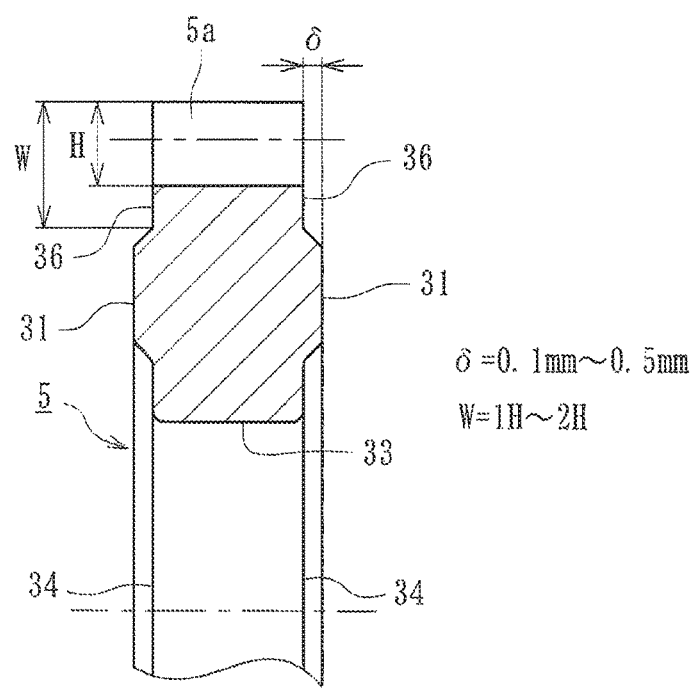
FIG. 6 is an explanatory view of relations of dimensions of the tooth tip of FIG. 5.
Figure 7:
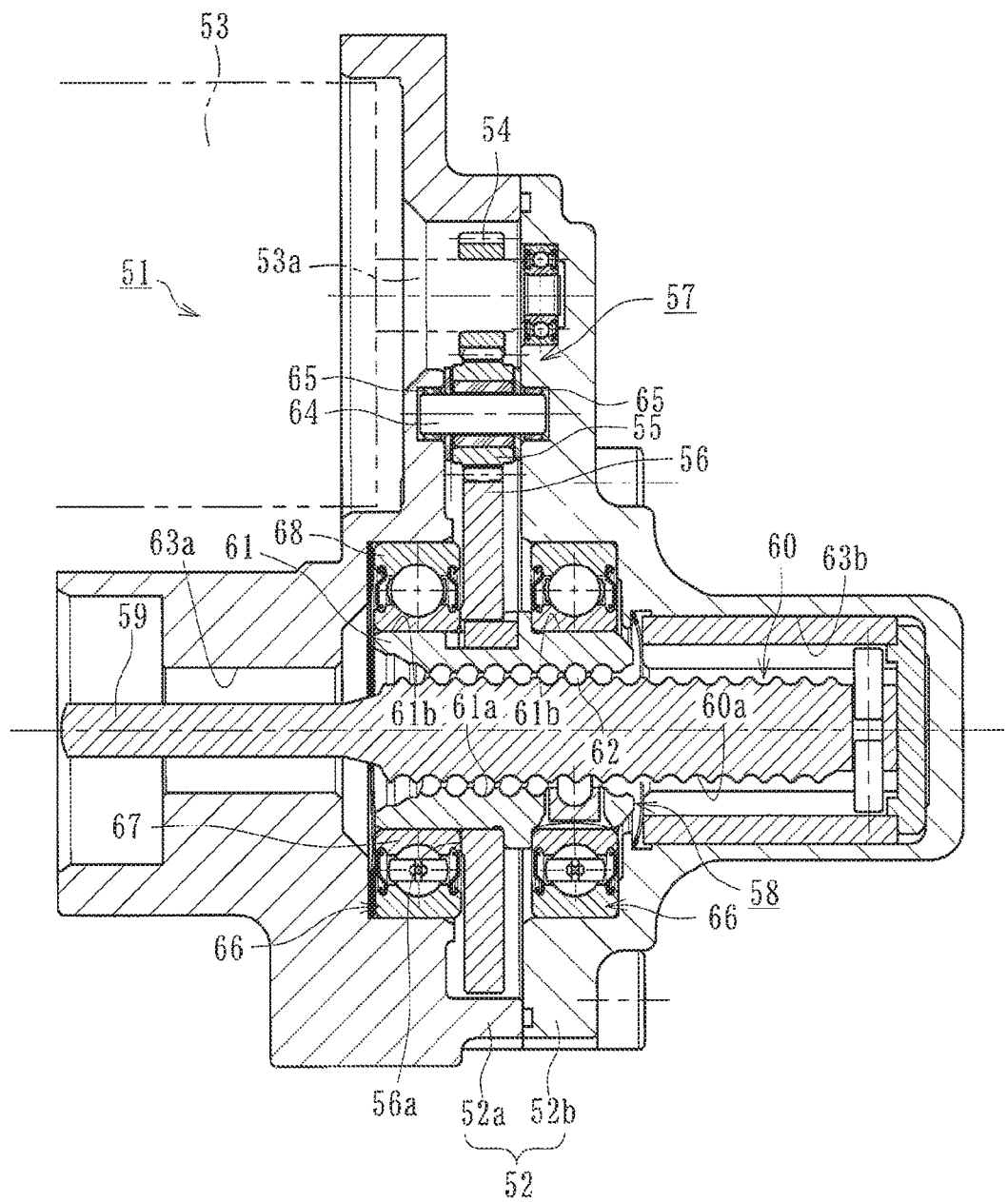
FIG. 7 is a longitudinal section view of a prior art electric linear actuator.
Figure 8A:
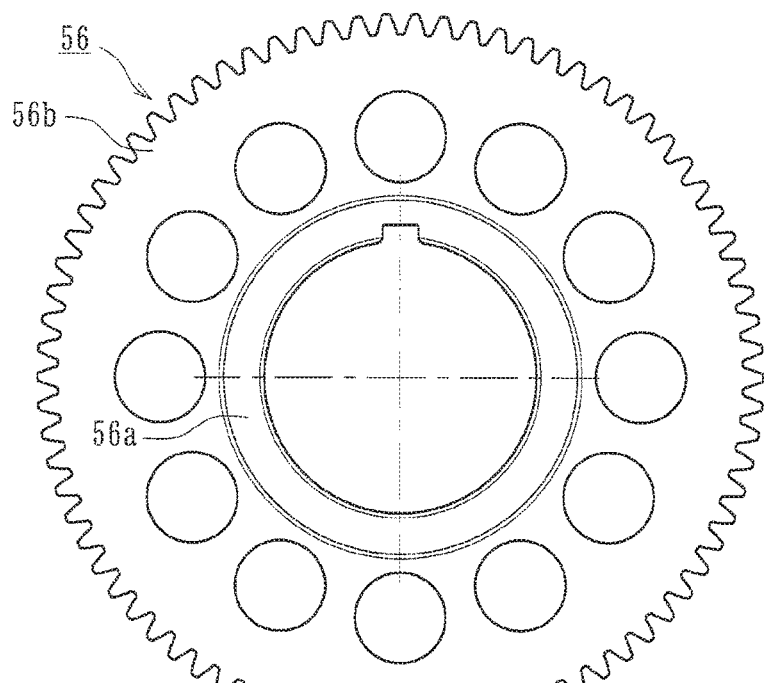
FIG. 8(a) is a plan view of the output gear of FIG. 7.
Figure 8B:
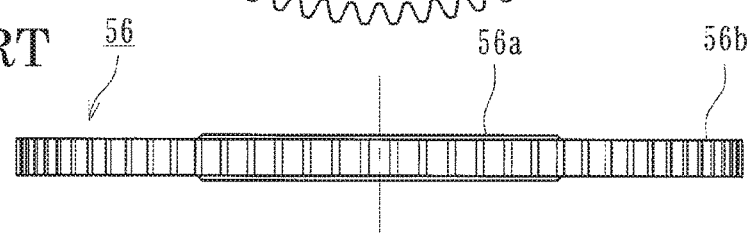
FIG. 8(b) is a front view of the output gear of FIG. 8(a).
Figure 9:
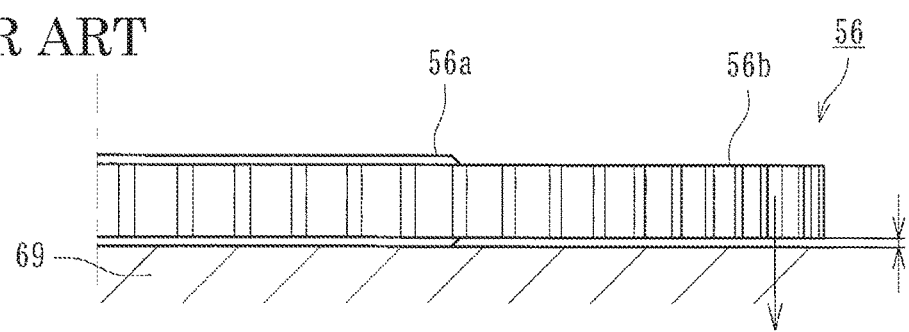
FIG. 9 is an explanatory view of a state of the output gear of FIG. 7 laid on a supporting table.

FIG. 1 is a longitudinal section view of one preferable embodiment of an electric linear actuator of the present disclosure. FIG. 2 is an enlarged longitudinal section view of the ball screw mechanism of FIG. 1. FIG. 3 is a perspective view of an output gear of the present disclosure. FIG. 4 is a partially enlarged view of a contact portion between the output gear of FIG. 1 and a supporting bearing. FIG. 5(a) is an explanatory view of a state of the output gear of FIG. 1 laid on a supporting table. FIG. 5(b) is a partially enlarged view of a tooth tip of the output gear of FIG. 5(a). FIG. 6 is an explanatory view of relations of dimensions of the tooth tip of FIG. 5.

As shown in FIG. 1, the electric actuator 1 includes a cylindrical housing 2, an electric motor M mounted on the housing 2, a speed reduction mechanism 6 and a ball screw mechanism 8. The speed reduction mechanism 6 includes an intermediate gear 4 mating with an input gear 3 mounted on a motor shaft 3a of the electric motor M. An output gear 5 mates with the intermediate gear 4. The ball screw mechanism 8 converts rotational motion of the electric motor M to axial linear motion of a driving shaft 7, via the speed reduction mechanism 6.

The housing 2 is formed of aluminum alloy such as A 6063 TE, ADC 12 etc. by die casting. The housing 2 includes a first housing 2a and a second housing 2b. The second housing 2b abuts and is bolted to an end face of the first housing 2a. The electric motor M is mounted on the first housing 2a. The first housing 2a and the second housing 2b are formed with a through bore 11 and a blind bore 12, respectively, to contain the screw shaft 10, coaxially integrated with the drive shaft 7.

The input gear 3 is press-fit onto the end of the motor shaft 3a of the electric motor M. The motor shaft 3a is rotationally supported by a rolling bearing 13. The bearing 13 is a deep groove ball bearing mounted on the second housing 2b. The output gear 5, mating with the intermediate spur gear 4, is integrally secured on a nut 18, forming part of the ball screw mechanism 8, via a key 14.

The drive shaft 7 is integrally formed with a screw shaft 10, forming part of the ball screw mechanism 8. Guide pins 15, 15 are mounted on one end (right-side end in FIG. 1) of the drive shaft 7. A sleeve 17 is fit in the blind bore 12 of the second housing 2b. The inner circumference of the sleeve 17 includes axially extending recessed grooves 17a, 17a. The sleeve grooves 17a, 17a are formed by grinding. The recessed grooves 17a, 17a are circumferentially oppositely arranged. The guide pins 15, 15 engage the grooves 17a, 17a to axially movably support but not rotationally support the screw shaft 10. Falling-out of the sleeve 17 can be prevented by a stopper ring 9 mounted on an opening of the blind bore 12 of the second housing 2b.

The sleeve 17 is formed from a sintered alloy by an injection molding machine for molding plastically prepared metallic powder. In this injection molding, metallic powder and binder, comprised of plastics and wax, are firstly mixed and kneaded by a mixing and kneading machine to form pellets from the mixed and kneaded material. The pellets are fed into a hopper of the injection molding machine. The pellets are then pushed into dies under a heated and melted state and finally formed into the sleeve by a so-called MIM (Metal Injection Molding) method. The MIM method can easily mold sintered alloy material into articles having desirable accurate configurations and dimensions even though the articles require high manufacturing technology and have hard to form configurations.

On the other hand, the guide pins 15 are formed of high carbon chromium bearing steel such as SUJ 2 or carburized bearing steel such as SCr 435. Their surfaces are formed with a carbonitrided layer having carbon content of more than 0.80% by weight and a hardness of more than 58 HRC. In this case, it is possible to adopt needle rollers used in needle bearings as guide pins 15. This makes it possible to have the guide pins 15 with a hardness of HRC 58 or more. Also, the pins 15 have excellent anti-wear property, availability and manufacturing cost.

As shown in the enlarged view of FIG. 2, the ball screw mechanism 8 includes the screw shaft 10 and the nut 18, inserted on the screw shaft 10 via balls 19. The screw shaft 10 is formed, on its outer circumference, with a helical screw groove 10a. It is axially movably but not rotationally supported. On the other hand, the nut 18 is formed, on its inner circumference, with screw groove 18a that corresponds to the screw groove 10a of the screw shaft 10. A plurality of balls 19 is rollably contained between the screw grooves 10a, 18a. The nut 18 is axially immovably but rotationally but supported by the two supporting bearings 20, 20 relative to the housings 2a, 2b. A numeral 21 denotes a bridge member to achieve an endless circulating passage of balls 19 through the screw groove 18a of the nut 18.

The cross-sectional configuration of each screw groove 10a, 18a may be either one of circular-arc or Gothic-arc configuration. However, the Gothic-arc configuration is adopted in this embodiment. It has a large contacting angle with the balls 19 and sets a small axial gap. This provides large rigidity against the axial load and thus suppresses the generation of vibration.

The nut 18 is formed of case hardened steel such as SCM 415 or SCM 420. Its surface is hardened to HRC 55~62, by vacuum carburizing hardening. This omits treatments, such as buffing, for scale removal after heat treatment and reduces the manufacturing cost. On the other hand, the screw shaft 10 is formed of medium carbon steel such as S55C or case hardened steel such as SCM 415 or SCM 420. Its surface is hardened to HRC 55~62, by induction hardening or carburizing hardening.

The output gear 5, forming part of the speed reduction mechanism 6, is firmly secured on the outer circumference 18b of the nut 18, via a key 14. The support bearings 20, 20 are press-fit onto the nut 18, via a predetermined interference, at both sides of the output gear 5. More particularly, the output gear 5 is secured on the nut 18 by the key 14. It is fit in a rectangular space formed by a key way 14a on an outer circumference 18b of the nut 18 and a key way 32a on an inner circumference of the output gear 5. This prevents both the supporting bearings 20, 20 and output gear 5 from axially shifting even though strong thrust loads are applied to them from the drive shaft 7. Each supporting bearing 20 is a deep groove ball bearing. Both sides include mounted shield plates 20a, 20a to prevent lubricating grease, sealed within the bearing body, from leaking outside and abrasive debris from entering into the bearing body from the outside.

In the present embodiment, both the supporting bearings 20, 20 are formed by deep groove ball bearing having the same specifications. Thus, it is possible to support both a thrust load, applied from the driving shaft 7, and a radial load, applied from the output gear 5. Also, this simplifies confirmation work to prevent errors during assembly of the bearing. Thus, this improves the assembling operability. In this case, the term "same specifications" means that the deep groove ball bearings have the same inner diameters, outer diameters, width dimensions, rolling element sizes, rolling element numbers and internal clearances.

One of the pair of supporting bearings 20, 20 is mounted on the first housing 2a via a washer 22. The washer 22 is a ring-shaped elastic member. The washer 22 is a wave washer press-formed from austenitic stainless steel (JIS SUS 304 etc.) or preserved cold rolled steel sheet (JIS SPCC etc.). It has high strength and wear resistance. An inner diameter D of the washer 22 is larger than an outer diameter d of the inner ring 23 of the supporting bearing 20. This eliminates axial play of the pair of supporting bearings 20, 20. Thus, smooth rotation of the nut 18 is obtained. In addition, the washer 22 contacts only the outer ring 24 of the supporting bearing 20. The washer 22 does not contact the rotational inner ring 23. Thus, it is possible to prevent the inner ring 23 of the supporting bearing 20 from contacting the housing 2a even if the nut 18 is urged toward the housing 2a by a reverse-thrust load. Thus, this prevents the nut 18 from being locked by an increase of frictional force.

As shown in FIG. 1, a gear shaft 25 for the intermediate gear 4, forming part of the speed reduction mechanism 6, is fit in the first and second housings 2a, 2b. The intermediate gear 4 is rotationally supported on the gear shaft 25, via a rolling bearing 26. When press-fitting one end (first housing 2a-side end) of the gear shaft 25 into the first housing 2a, it is possible to allow assembling misalignment. Thus, smooth rotational performance by performing the clearance fitting of the other end (second housing 2b-side end) may be obtained. The rolling bearing 26 is formed from a needle roller bearing of a so-called shell type. It includes an outer ring 27 and a plurality of needle rollers 29 press-formed from steel sheet and press-fit into an inner circumference of the intermediate gear 4. The plurality of needle rollers 29 are rollably contained in the outer ring 27 via a cage 28. This enables the adoption of easily or readily available bearings or a standard design and thus reduces manufacturing cost.

Ring-shaped washers 30, 30 are installed on both sides of the intermediate gear 4. The washers 30, 30 prevent direct contact of the intermediate gear 4 against the first and second housings 2a, 2b. In this embodiment, the face width of the teeth 4a of the intermediate gear 4 is smaller than an axial width of the gear blank. This reduces contact area between the intermediate gear 4 and the washers 30, 30. Thus, their frictional resistance is reduced and smooth rotational performance is obtained. The washers 30 are flat washers press-formed of austenitic stainless steel sheet or preserved cold rolled steel sheet. They have high strength and frictional resistance. Alternatively, the washers 30 may be formed of brass, sintered metal or thermoplastic synthetic resin such as PA (polyamide) 66, where a predetermined amount of fiber reinforcing material such as GF (glass fibers) is impregnated.

The output gear 5 is formed from a sintered alloy. It includes spur teeth 5a on its circumference and a central (circular) hole 5b. The hole 5b is adapted to be fit onto the outer circumference 18b of the nut 18. A plurality of lightening holes 33 are formed in a middle portion 34 equidistantly along a circle between a peripheral portion 31, near the teeth 5a, and a boss 32 near the central hole 5b. The key way 32a engages the securing key 14. The key way 32a is formed on the inner circumference of the boss 32. Although it is illustrated with circular lightening holes 33, the shape of each hole 33 is not limited to a circle. Any other shape, an egg-shape or a triangle with a configuration expanding radially outward may be possible. The lightening holes 33 reduce the weight of the output gear 5 while keeping the strength and rigidity of the output gear 5.

Metallic powder for the sintering alloy comprises completely alloyed powder Fe, Mo, Ni (atomized iron powder of alloyed and melted steel where alloyed components are uniformly distributed in the grains) or partially alloyed powder (alloyed powder where partially alloyed powder is adhered to pure iron powder). One example of the alloyed powders is a hybrid type alloyed powder (trade name JIP 21 SX of JFE steel Co., Japan) where pre-alloy copper powder with Fe of 2% by weight, Ni of 1% by weight and Mo is adhered to fine Ni powder, Cu powder and graphite powder via a binder. This hybrid type alloyed powder is able to obtain high mechanical strength (tensioning strength and hardness) due to an increase of martensite phase ratio to the metallic structure of the sintered body while increasing the cooling speed (higher than 50° C./min) after sintering. This eliminates heat treatment after sintering and thus provides an output gear with high accuracy. It is preferable Mo of 0.5~1.5% by weight in order to improve the hardenability and Ni of 2~4% by weight is added in order to improve the toughness of a sintered body. Similarly to the sleeve 17 described above, the output gear 5 may be formed of sintered alloy by an MIM method by preparing the metallic powder plastically.

As shown in FIG. 5(a), the axial thickness of the peripheral portion 31, near the teeth 5a, and that of the boss 32, near the central hole 5b of the gear 5, are substantially the same. Side faces of the peripheral portion 31 and the boss 32 of the gear 5 are substantially axially flush with each other. The axial thickness of the middle portion 34 between the peripheral portion 31 and a boss 32 is set thinner. The terms "substantially same" and "substantially axially flush" in the specification mean only target values in design and thus errors caused by machining should be naturally allowed.

The output gear 5 with such structure enables the end face of the inner ring 23 of the supporting bearing 20 rotating together with the nut 18 to closely contact the side surface of the boss 32 of the output gear 5. The outer ring 24 of the stationary side is separated from the side surface of the boss 32 as shown in FIG. 4. Thus, smooth rotation of the output gear 5 can be assured.

In addition, the axial thickness of the peripheral portion 31, near the teeth 5a, and that of the boss 32, near the central hole 5b of the gear 5, are substantially the same. The side faces of the peripheral portion 31 and the boss 32 of the gear 5 are substantially axially flush with each other. Thus, not only the boss 32 but also the peripheral portion 31 contact a surface of a supporting table 35, as shown in FIG. 5(b). This occurs when the gear 5 is laid on the supporting table during manufacturing steps of the gear 5. Accordingly, it is possible to prevent damage to the gear teeth 5a. Thus, accuracy degradation is prevented due to interference of the teeth 5a with the surface of the supporting table that would occur by deformation of the gear 5 by its own weight even if the binding degree of powder is insufficient.

In addition, problems in the output gear 5, formed of sintered alloy of this kind, exists in that variation of the density of each part of the gear 5 tends to be generated due to variation of a compaction distance (pressing distance) during sintering. This occurs when a clearance amount δ of a stepped portion 36 between the end face of the tooth 5a and the side surface of the peripheral portion 31 is set too large, as shown in FIG. 6. Thus, according to the present embodiment, the clearance amount δ between the tooth 5a and the peripheral portion 31 of the gear 5 is limited within a range of 0.1~0.5 mm. This protects the tip ends of the teeth 5a and suppresses variation of the density of each part of the gear.

Furthermore, a width W of the stepped portion 36 from the peripheral portion 31 to the tooth tip is set to 1~2 times the entire depth H of the tooth 5a (W=1~2H). This prevents a bow of the tooth tip portion due to deformation of the peripheral portion 31 even if the gear 5 is laid on the supporting table.

Although shown in the exemplified embodiment that the output gear 5 where the axial thickness of the peripheral portion 31, near the teeth 5a, and that of the boss 32, near the central hole 5b of the gear 5, are substantially same, and both side faces of the peripheral portion 31 and the boss 32 of the gear 5 are substantially axially flush with each other, the present disclosure is not limited to such an embodiment. Accordingly, it may be possible to arrange so that side faces of the peripheral portion 31 and the boss 32 of at least one side of the gear 5 are substantially axially flush with each other. At least the boss 32 contacting the side surface of the inner ring 23 is formed thicker so as to achieve that the outer ring 24 of the supporting bearing 20 does not contact with the side face of the boss 32 of the output gear 5.

In addition, the side faces of the peripheral portion 31, near the teeth 5a, and the boss 32, near the central hole 5b, do not necessarily have to be flat all along their circumference. At least the side face of boss 32 may be an uneven surface so that oil films of lubrication grease can be easily formed in order to prevent fretting of the contact surfaces between the boss 32 and the inner ring 23 of the supporting bearing 20.

The electric actuator of the present disclosure can be used on electric motors for a general industry use, driving portions of an automobile etc. and applied to an actuator provided with a ball screw mechanism that converts a rotational input motion from an electric motor to a linear motion of a drive shaft via a gear reduction mechanism.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A gear formed of sintered alloy comprising:
   spur teeth formed on a circumference of the gear;
   a central hole on the center of the gear;
   a boss formed around and adjacent the central hole;
   a peripheral portion is formed radially inward of and adjacent the teeth so that a step portion, projecting directly from the peripheral portion, is formed adjacent the teeth between the teeth and the peripheral portion, a thickness of a region between the boss and the peripheral portion being thinner than that of the boss; and
   the peripheral portion is formed on at least one side of the gear and has an axially larger thickness than the region between the boss and peripheral portion, the axial thickness of the peripheral portion and that of the boss of the gear are substantially same, and side faces of the peripheral portion and the boss of at least one side of the gear are substantially axially flush with each other;
   a clearance amount (δ) between the tooth and the peripheral portion of the gear is limited within a range of 0.1~0.5 mm.

2. The gear of claim 1, wherein the width (W) of a stepped portion from the peripheral portion to the tooth tip is set to 1~2 times the whole depth (H) of the tooth.

3. The gear of claim 1, wherein a plurality of lightening holes are formed equidistantly along a circle between the peripheral portion and the boss.

4. An electric actuator comprising:
a housing;
an electric motor mounted on the housing;
a speed reduction mechanism for transmitting rotational force of the motor to a ball screw mechanism;
the ball screw mechanism converting the rotational motion of the electric motor to the axial linear motion of a drive shaft, the ball screw mechanism includes a nut and a screw shaft, the nut has a helical screw groove on its inner circumference, an output gear is secured on its outer circumference, the output gear forms part of the speed reduction mechanism, the nut is rotationally but axially immovably supported relative to the housing by a pair of supporting bearings mounted on the housing, the screw shaft has a helical screw groove on its outer circumference corresponding to the helical screw groove of the nut, the screw shaft is inserted into the nut via a large number of balls, the screw shaft is axially movably but non-rotationally supported relative to the housing;
an end face of an inner ring of one supporting bearing of the pair of supporting bearings and a side surface of the boss closely contact each other; and
the output gear is configured by a gear defined in claim 1.

5. The electric actuator of claim 4, wherein the screw shaft is coaxially integrated with the drive shaft.

\* \* \* \* \*